(12) United States Patent
Lehnhoff et al.

(10) Patent No.: US 10,328,602 B2
(45) Date of Patent: *Jun. 25, 2019

(54) METHOD FOR FINISHING A WOOD BOARD

(71) Applicant: FLOORING TECHNOLOGIES LTD., Ricasoli, Kalkara (MT)

(72) Inventors: Ingo Lehnhoff, Dierhagen (DE); Frank Oldorff, Schwerin (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,620

(22) Filed: Apr. 30, 2018

(65) Prior Publication Data

US 2018/0243940 A1 Aug. 30, 2018

Related U.S. Application Data

(62) Division of application No. 15/527,216, filed as application No. PCT/EP2015/001988 on Oct. 9, 2015, now Pat. No. 9,993,940.

(30) Foreign Application Priority Data

Nov. 20, 2014 (EP) .................................. 14003902.5

(51) Int. Cl.
*B32B 21/06* (2006.01)
*B27N 7/00* (2006.01)
(Continued)

(52) U.S. Cl.
CPC .............. *B27N 7/005* (2013.01); *B32B 21/06* (2013.01); *B44C 5/04* (2013.01); *B32B 21/02* (2013.01);
(Continued)

(58) Field of Classification Search
None
See application file for complete search history.

(56) References Cited

U.S. PATENT DOCUMENTS

| 3,231,458 A | 1/1966 | Lawson |
| 5,641,819 A | 6/1997 | Campbell et al. |

(Continued)

FOREIGN PATENT DOCUMENTS

| DE | 19751115 A1 | 5/1999 |
| DE | 102004026739 A1 | 12/2005 |

(Continued)

OTHER PUBLICATIONS

Communication in related EP application 14 003 902.5-1704 dated Oct. 24, 2016, 18 pages.

(Continued)

*Primary Examiner* — Jeffry H Aftergut
*Assistant Examiner* — Jaeyun Lee
(74) *Attorney, Agent, or Firm* — Andrew M. Calderon; Roberts Mlotkowski Safran Cole & Calderon, P.C.

(57) ABSTRACT

The disclosure relates to a method for finishing a wood board with an upper face and a lower face. A layer of liquid synthetic resin is first applied at least onto the upper face or the lower face, and at least one paper ply soaked with a synthetic resin is then applied. The structure is then pressed in a press under high pressure and at a high temperature, wherein the synthetic resin melts and is connected to the upper face or the lower face of the wood board. The invention is characterized in that the upper face and/or the lower face is provided while still having a press skin and in an ungrounded state, and the layer is applied so thinly that the liquid synthetic resin is completely drawn into the press skin, the layer is not actively dried, and the paper ply is positioned on the press skin.

17 Claims, 3 Drawing Sheets

(51) Int. Cl.
*B44C 5/04* (2006.01)
*B32B 21/02* (2006.01)
(52) U.S. Cl.
CPC ... *B32B 2260/028* (2013.01); *B32B 2260/046* (2013.01); *B32B 2307/50* (2013.01); *B32B 2307/554* (2013.01); *B32B 2451/00* (2013.01)

(56) References Cited

U.S. PATENT DOCUMENTS

| | | | |
|---|---|---|---|
| 6,409,834 B1 | 6/2002 | Frati | |
| 8,480,841 B2 * | 7/2013 | Pervan | ......... B44C 5/0476 156/279 |
| 2005/0208299 A1 | 9/2005 | Minamida et al. | |
| 2008/0000581 A1 | 1/2008 | Nison et al. | |
| 2011/0052905 A1 | 3/2011 | Smith | |
| 2012/0325418 A1 | 12/2012 | Wicher | |
| 2015/0314639 A1 | 11/2015 | Kalwa | |

FOREIGN PATENT DOCUMENTS

| | | |
|---|---|---|
| DE | 102007012236 A1 | 9/2008 |
| DE | 102012110075 A1 | 4/2014 |
| EP | 1623807 | 2/2006 |
| EP | 1754583 | 2/2007 |
| EP | 2236313 A1 | 10/2010 |
| EP | 2743094 A1 | 10/2010 |
| EP | 2762328 A1 | 8/2014 |
| WO | 9510402 | 4/1995 |

OTHER PUBLICATIONS

Communication in related EP application 14 003 902.5-1704 dated Oct. 24, 2016, 20 pages.

* cited by examiner

METHOD FOR FINISHING A WOOD BOARD

FIELD OF THE INVENTION

The invention relates to a process for the finishing of a wooden composite board with an upper side and an underside, in that firstly a layer of liquid synthetic resin is applied at least to the upper side or the underside, then at least one paper ply impregnated with a synthetic resin is applied, and this structure is then pressed in a press under high pressure and at high temperature, where the resin melts and bonds to the wooden composite board.

DISCUSSION OF BACKGROUND INFORMATION

Such a process is known, for example, from EP 2 743 094 A1. Applying synthetic resin to the upper side of the carrier board is intended to make it possible to use a decor paper that is impregnated on only one side, because the liquid resin applied to the carrier board solubilises the pre-dried impregnating agent on the back side of the decor paper, so that the decor paper adheres more quickly to the carrier board. Before the decor paper is applied, the synthetic resin layer applied in liquid form on the upper side must be dried.

In the wooden composite board disclosed in DE 10 2007 012 236 B4, a carrier layer of paper is first applied to the upper side. A decorative layer is applied to this carrier layer, and then a sealing lacquer coat is applied to the decorative layer. The lacquer coat is then hardened completely by means of electron beams and a structure is embossed in the lacquer coat.

Individual panels are then cut out of a large-sized laminate board so finished, which panels can be used as a floor, wall or ceiling covering. The panels can be provided with a tongue-and-groove connection on their side edges. A problem with laminates having a paper structure is delamination, which is to be encountered wherever materials are joined together layerwise with the addition of binder, heat and pressure. Delamination can in many cases be seen externally as blisters, or the paper layer in a panel becomes detached from the board at the edges.

In order to rule out delamination, there has occasionally been a move towards coating boards directly.

DE 197 51 115 A1 discloses a method of coating a panel, in which at least one coloured layer is applied to the surface by means of a printing method, in particular by means of screen printing. The surface can thereby be untreated, ground or pretreated, in particular lacquered. The applied coloured layer can finally be covered by coating with clear lacquer.

In DE 10 2004 026 739 A1 there is described a method in which an undercoat is applied by means of a roller to the upper side of the wooden composite board and dried. A first and second lacquer layer which hardens under the action of UV light is then applied to the dried undercoat, hardening not being completed. Finally, a UV-hardenable top-coat lacquer is applied to the first two lacquer layers, and the topmost lacquer layer is then plastically deformed. Direct printing is very expensive and must be carried out very carefully in order to avoid inclusions in the print structure. In addition, it is important that each individual layer is dried sufficiently before the next layer is applied in liquid form, in order to prevent colours from merging.

When direct printing technology is used, that is to say when the individual layers are printed directly onto a carrier board, there is ultimately a reduction in thickness of the finished laminate panels compared to panels manufactured in the conventional manner owing to the omission of the paper plies. This leads to problems in continuous production, when the large-sized coated laminate boards are then divided up to produce the panels. In order to ensure that individual panels do not fail to meet DIN 13329 because they are undersized in terms of thickness, rigorous quality assurance must be implemented, which on the one hand slows down manufacture and on the other hand increases the production costs further. Ultimately, it also causes irritation for the retailer and/or end user, since the stacking height of direct-coated boards is visibly different from that of boards coated with paper plies.

In the known board manufacture, HDF boards or MDF boards are conventionally used as the carrier board, the upper side of which is ground off by about 0.3 mm. A press skin, also called a press patina or rotting layer, forms on the upper side and the underside of the carrier board. This press skin forms during pressing of the pressed fibre mat and is produced by the hot surface of the pressing plates or belts of the press. The press skin has a thickness of about 0.3 mm. Since the press skin is ground off completely and about 0.1 mm of the core material is ground off in order to reduce the surface roughness on the upper side of the board prior to further coating, the boards must be manufactured thicker by a corresponding grinding allowance, which adversely affects the production costs. In order to produce a floor laminate having a thickness of 6.0 mm which conforms to standards and is produced by direct printing technology, the carrier board must have at least 0.61 mm.

In EP 2 236 313, for example, it is described that the press skin must be ground off because the heat input in the region thereof during hot pressing is so high that the adhesive hardens too quickly, so that glue bridges break at least partly and make the applied layer sensitive. This breaking of the glue bridges makes finished panels susceptible to lifting of the decorative and abrasion-resistant layers applied to the carrier board. This delamination, which can occur even under normal loading and out of the order of magnitude typical for wooden composite materials due to climate fluctuations, is not tolerated by the customer.

SUMMARY OF THE INVENTION

There is therefore a great need for abrasion-resistant laminate panels which are within the thickness tolerance found in the above-mentioned standard. There is further a need for a resource-saving production process in which extra costs arising from additional process steps and/or additional materials are largely avoided.

Starting from this problem, a process for the finishing of a wooden composite board that is coated with at least one paper ply is to be so improved that a strong bond between the paper layer and the upper side of the wooden composite board is produced, so that delamination is reliably avoided. In this case, it ideally ought to be possible to use conventional fully impregnated paper.

The problem is solved in the case of a process of the generic type in that the upper side and/or the underside retain a press skin and are provided without surface grinding, and the layer applied is so thin that all of the liquid synthetic resin enters the press skin, no active drying of the layer takes place, and the paper ply is placed onto the press skin.

It has been shown, wholly surprisingly, that this application of synthetic resin, which is known per se from direct printing technology, leads to a substantial improvement in the adhesion of the paper ply to the upper side and/or the underside of the wooden composite board. Because the paper, which is generally a decorative paper, is impregnated with a synthetic resin, it could be assumed that this better adhesion occurs simply because more resin is used in the lamination. This assumption is not correct, however, because delamination phenomena are known to occur even when the decorative paper is saturated with resin and a paper that is very absorbent is used, so that the amount of synthetic resin that enters the laminate structure is increased. Delamination cannot reliably be prevented with such a structure.

Tests have shown that the resin with which the paper ply is impregnated does not begin to dissolve, as it does in EP 2 743 094 A1. The synthetic resin drawn completely into the press skin is inactive here.

The improved adhesion is probably attributable to the fact that the upper side and/or the underside is provided without surface processing, that is to say untreated and with the full press skin. The synthetic resin applied in liquid form penetrates into the press skin and thus forms, together with the press skin, an optimum base for the decorative paper applied subsequently.

The liquid synthetic resin can be applied by rolling, spreading, trowelling or spraying.

By omitting active drying, the manufacturing process is accelerated and, in addition, a significant energy saving is achieved.

Preferably, the liquid synthetic resin is applied in a quantity of from 5 to 100 $g/m^2$, in particular from 5 to 50 $g/m^2$ and more particularly preferably from 5 to 25 $g/m^2$.

The synthetic resin is preferably a melamine resin or a urea resin or a melamine-urea-resin mixture.

Good results have been achieved with a coating in which the ratio of synthetic resin to water is (60:40) with a tolerance of ±10%.

The synthetic resin can comprise additives, in particular hardeners and/or wetting agents and/or thermoplastic polymers.

The paper ply is preferably covered with a wear layer made of synthetic resin before the pressing procedure. This wear layer can be produced by an overlay paper impregnated with a synthetic resin. The paper ply is preferably a decorative paper. The wear layer can, however, also be applied in liquid form. It is also conceivable to scatter synthetic resin particles onto the paper ply for the wear layer.

The wooden composite board finished by the process according to the invention corresponds to a conventional laminate having a paper structure on the upper side, with the fundamental difference that the adhesion between the paper structure and the wooden composite board is significantly improved by the previously applied liquid synthetic resin layer. The wear layer can thus comprise abrasion-resistant particles, for example corundum, in order to increase the abrasion resistance of the laminate. A structure can be embossed in the wear layer during pressing of the laminate structure. This structure can correspond to the decoration ("synchronous pore"). The decoration can be a wood grain or a tile effect. In the case of a wood grain, the structure then corresponds to the pattern of the grain, the knotholes or pores in the reproduced wood surface. In the case of a tile effect, the structure corresponds to the joints.

The improvement achieved compared to a conventional laminate structure having paper plies can readily be seen in the figures. The figures each show an apparent density profile of a coated MDF board from the upper side (0 mm) to the middle of the wooden composite core (3 mm).

DETAILED DESCRIPTION OF THE PRESENT INVENTION

Figure 1:
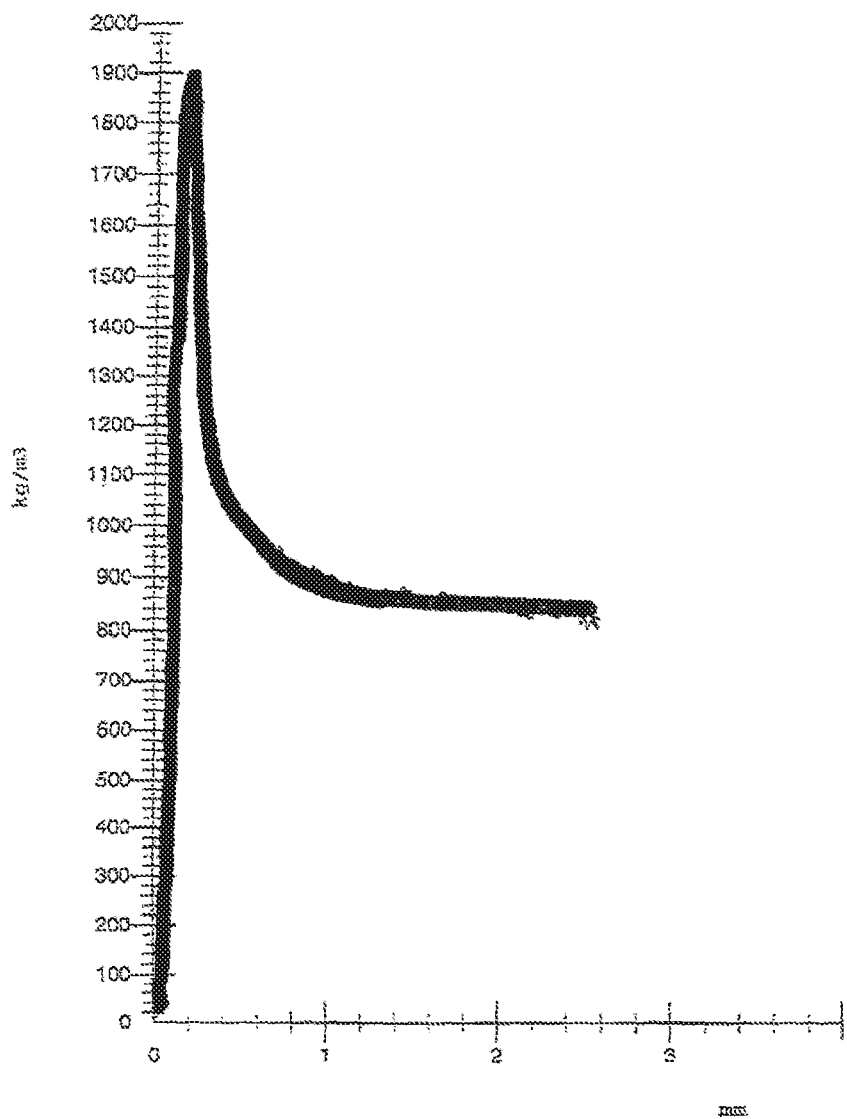
FIG. 1 shows a laminate structure.

FIG. 1 shows the laminate structure with a standard MDF board, the upper side of which has been ground in order to remove the press skin completely. A synthetic-resin-impregnated decorative paper ply has been placed on the ground upper side, and an overlay paper ply has been placed thereon and pressed. The delamination strength of the top layer is 2.0±0.1 $N/m^2$. The high apparent density of 1900 $kg/m^3$ results on the upper side from the paper structure. The apparent density falls continuously towards the middle of the wooden composite core.

Figure 2:
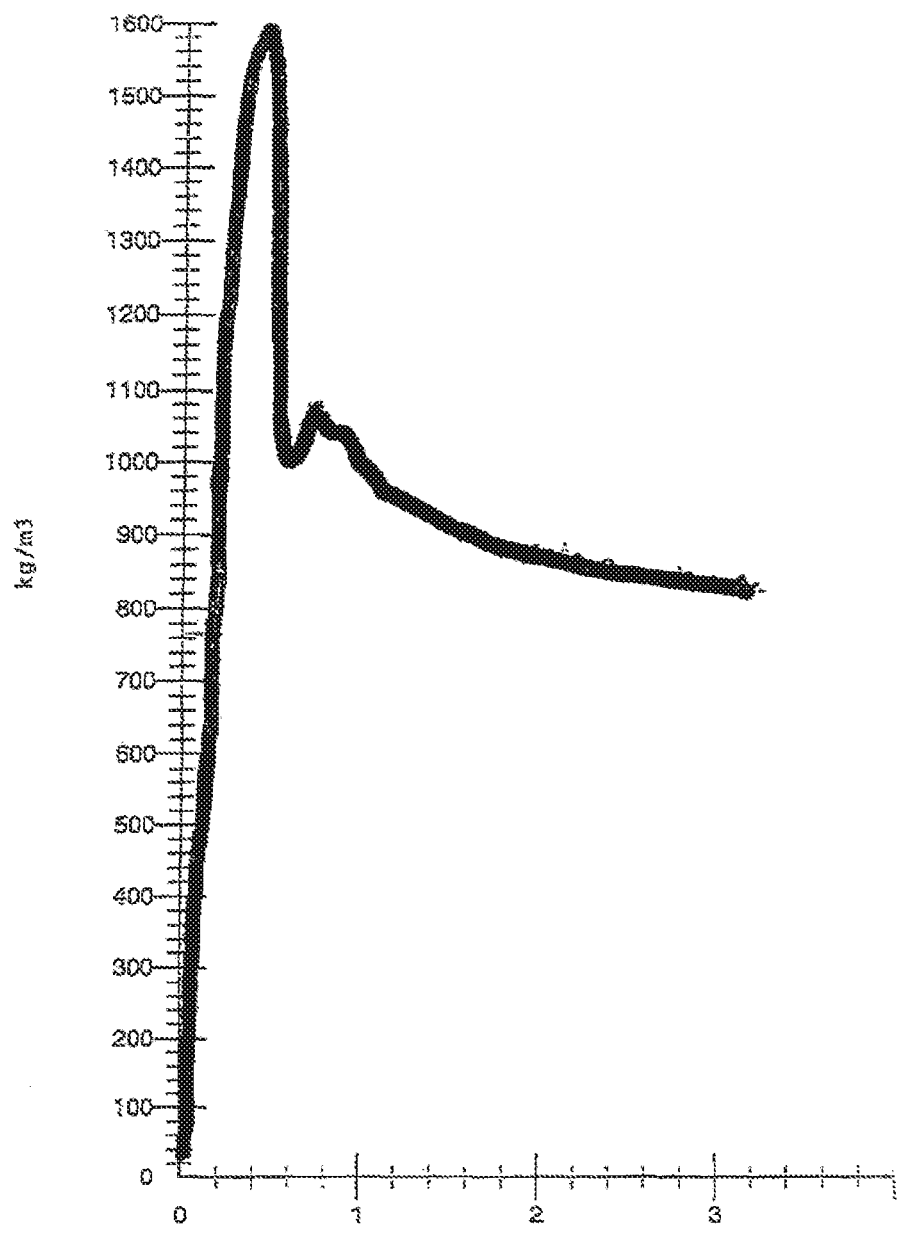
FIG. 2 shows a diagram.

In the case of the diagram shown in FIG. 2, a standard MDF board with an unground upper side has been used, that is to say an MDF board with a complete press skin, on which a synthetic-resin-impregnated decorative ply and an overlay paper ply have been placed and pressed. The abrasion resistance of the top layer is 1.5±0.3 N/m. The apparent density is here lower at the peak, but it is also formed by the paper layers. The apparent density initially falls continuously, the increase at a depth of about 0.25 mm results from the press skin, which has not been removed from the upper side. Here there is a risk of delamination, because the bond between the paper structure and the wooden composite board is poor.

Figure 3:
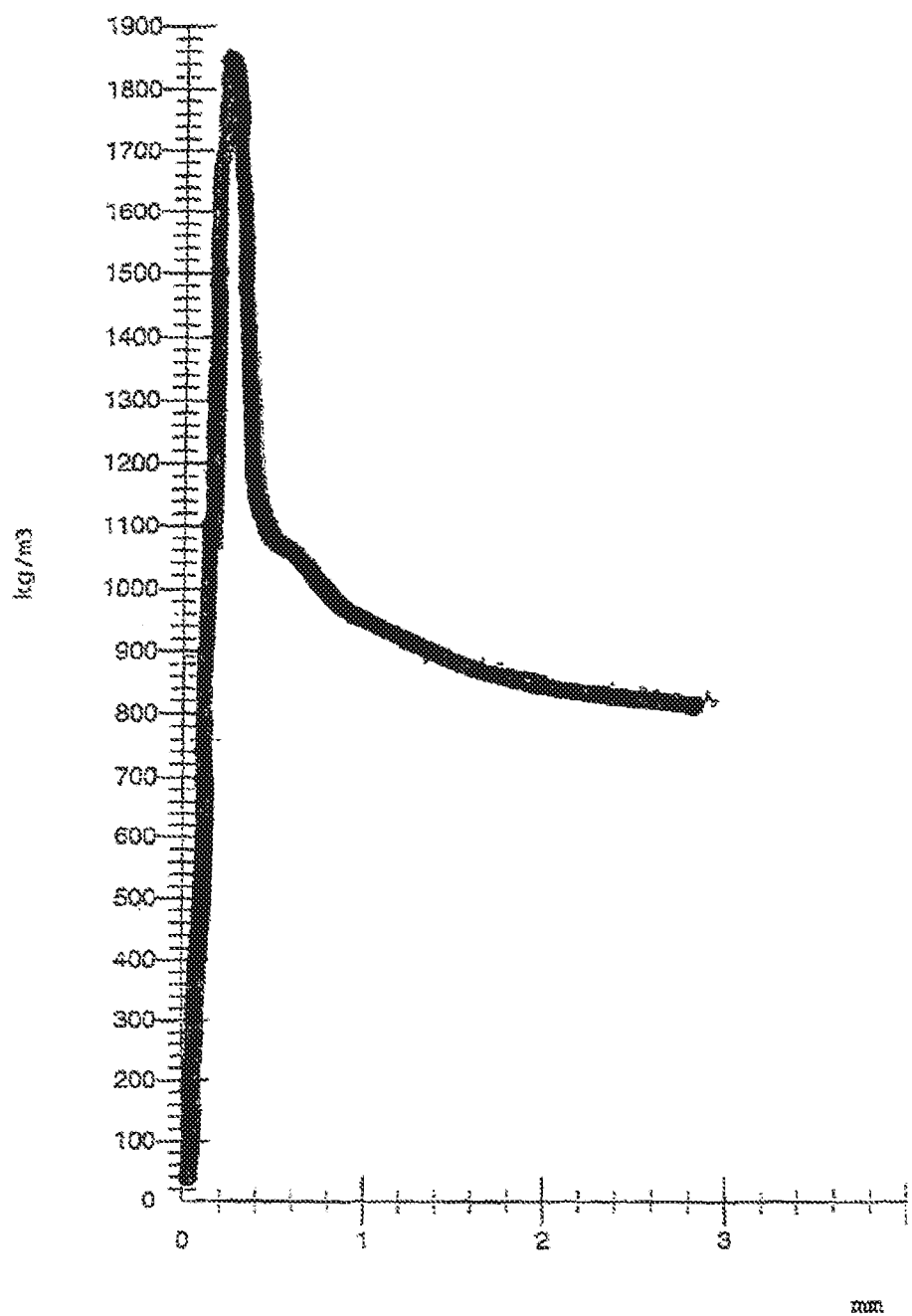
FIG. 3 shows a board treated in accordance with the invention.

The board tested according to FIG. 3 is a standard MDF board treated according to the invention, which was made available with an unprocessed upper side and coated with 50 $g/m^2$ melamine resin before a synthetic-resin-impregnated decorative paper and overlay paper ply were placed on and pressed. The abrasion resistance of the top layer was 1.9±0.1 $N/mm^2$. It can be seen that the maximum apparent density reaches almost the value of the standard board (FIG. 1), but this then falls continuously and, although the press skin was not removed, no further increase in the apparent density is to be noted. As can be seen from a comparison of FIGS. 2 and 3, the defect which can lead to delamination phenomena could largely be avoided, so that a largely closed curve shape is established. Although the delamination strength of the top layer is at the level of the standard structure according to FIG. 1, it is to be taken into consideration that the production time is shortened significantly simply because the press skin does not have to be ground off, a cost saving is thereby achieved, and the region of the upper side that is to be ground off does not have to be compensated for beforehand by the introduction of more material during production of the MDF board. It will be seen that delamination is reliably avoided according to the invention, and in some cases the resin-coating of the impregnated paper plies can also be reduced because the synthetic resin necessary for bonding is possibly provided beforehand by the introduction of synthetic resin into the press skin. The underside of the wooden composite board can be finished in exactly the same way as the upper side. The upper side and the underside can also be treated identically. Both sides are then preferably finished at the same time.

What is claimed is:
1. A process for finishing a wooden composite board with an upper side and an underside, comprising:
firstly applying a layer of liquid synthetic resin at least to the upper side or the underside, applying at least one decorative paper comprising a synthetic resin and covered with a wear layer consisting of synthetic resin, and pressing in a press under high pressure and high temperature such that the synthetic resin melts and bonds to the upper side or the underside of the wooden composite board, wherein the upper side and/or the underside retain a press skin and are provided without surface-grinding and, to form an optimal base for the decorative paper, the liquid synthetic resin penetrates into the press skin, and the synthetic-resin-impregnated decorative paper is placed onto the press skin, wherein the liquid synthetic resin is a melamine resin or a urea resin or a melamine-urea-resin mixture.

2. The process as claimed in claim 1, wherein a finishing process is carried out identically on both the upper side and the underside.

3. The process as claimed in claim 1, wherein the liquid synthetic resin is applied by rolling, spreading, trowelling or spraying.

4. The process according to claim 1, wherein the layer of the liquid synthetic resin is applied to completely enter the press skin and no active drying of the layer of the liquid synthetic resin takes place.

5. The process as claimed in claim 4, wherein a quantity applied of the liquid synthetic resin is from 5 to 100 g/m$^2$.

6. The process as claimed in claim 5, wherein the quantity applied of the liquid synthetic resin is from 5 to 50 g/m$^2$.

7. The process as claimed in claim 6, wherein the quantity applied of the liquid synthetic resin is from 5 to 25 g/m$^2$.

8. The process as claimed in claim 1, wherein a ratio of the liquid synthetic resin to water is (60:40) with a tolerance of ±10%.

9. The process as claimed in claim 1, wherein the liquid synthetic resin comprises additives.

10. The process as claimed in claim 8, wherein the liquid synthetic resin comprises hardeners and/or wetting agents and/or thermoplastic polymers.

11. The process as claimed in claim 1, further comprising placing an overlay paper onto the decorative paper.

12. The process as claimed in claim 1, wherein the wear layer is applied in liquid form.

13. The process according to claim 1, further comprising scattering synthetic resin particles onto the decorative paper for the wear layer.

14. The process according to claim 1, wherein a structure is embossed in the wear layer during the pressing of the laminate structure.

15. The process according to claim 14, wherein the structure corresponds to the decoration.

16. The process according to claim 1, wherein the decoration is a wood grain or a tile effect.

17. The process according to claim 1, wherein the wear layer comprises abrasion-resistant particles, in particular consisting of corundum.

* * * * *